(12) United States Patent
Verma et al.

(10) Patent No.: US 10,449,461 B1
(45) Date of Patent: Oct. 22, 2019

(54) CONTEXTUAL IN-GAME ELEMENT RECOGNITION, ANNOTATION AND INTERACTION BASED ON REMOTE USER INPUT

(71) Applicant: Microsoft Technology Licensing, LLC, Redmond, WA (US)

(72) Inventors: Arunabh Verma, Seattle, WA (US); Raman Kumar Sarin, Redmond, WA (US); Alex R. Gregorio, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/973,123

(22) Filed: May 7, 2018

(51) Int. Cl.
- *A63F 13/86* (2014.01)
- *A63F 13/537* (2014.01)
- *A63F 13/63* (2014.01)
- *A63F 13/35* (2014.01)

(52) U.S. Cl.
CPC .............. *A63F 13/86* (2014.09); *A63F 13/35* (2014.09); *A63F 13/537* (2014.09); *A63F 13/63* (2014.09)

(58) Field of Classification Search
CPC ........ A63F 13/86; A63F 13/35; A63F 13/537; A63F 13/63
USPC ......................................................... 463/31
See application file for complete search history.

(56) References Cited

U.S. PATENT DOCUMENTS

| | | | |
|---|---|---|---|
| 8,751,942 B2 * | 6/2014 | Lopez .................... | H04N 5/445 715/753 |
| 9,108,108 B2 | 8/2015 | Zalewski et al. | |
| 2007/0238520 A1 * | 10/2007 | Kacmarcik ............. | A63F 13/10 463/33 |
| 2008/0015003 A1 | 1/2008 | Walker et al. | |
| 2008/0139301 A1 * | 6/2008 | Holthe .................... | A63F 13/00 463/25 |
| 2009/0118015 A1 | 5/2009 | Chang et al. | |
| 2009/0209337 A1 | 8/2009 | Vrignaud et al. | |
| 2011/0184805 A1 | 7/2011 | Margalit et al. | |

(Continued)

OTHER PUBLICATIONS

Baur, et al., "Context-Aware Automated Analysis and Annotation of Social Human-Agent Interactions", In Journal of ACM Transactions on Interactive Intelligent Systems, vol. 5, Issue 2, Jun. 2015, 33 Pages.

(Continued)

*Primary Examiner* — Allen Chan
(74) *Attorney, Agent, or Firm* — Fiala & Weaver P.L.L.C.

(57) ABSTRACT

Systems, methods, and apparatuses are provided for annotating a video frame generated by a video game. A video game model that associates element tags with elements of the video game may be generated. The video game model may be applied by a video game overlay executing concurrently with the video game. The video game overlay may receive a remote user input from one or more remote devices over a network. The remote user input may be multiplexed and/or normalized, and subsequently parsed by applying the video game model to extract an element tag corresponding to the video game. By applying the video game model, an in-game element of the video game corresponding to the element tag may be identified in the video frame. Based on the identified element in the video frame of the video game, the video frame may be annotated and presented to the video game user.

20 Claims, 6 Drawing Sheets

(56) References Cited

U.S. PATENT DOCUMENTS

| | | |
|---|---|---|
| 2011/0281648 A1 | 11/2011 | Weising |
| 2012/0028700 A1 | 2/2012 | Avent et al. |
| 2012/0225721 A1 | 9/2012 | Holder et al. |
| 2015/0110470 A1 | 4/2015 | Zhang et al. |
| 2016/0158656 A1* | 6/2016 | Condrey ................. A63F 13/86 463/31 |
| 2017/0113143 A1 | 4/2017 | Marr et al. |
| 2017/0228600 A1 | 8/2017 | Syed et al. |
| 2017/0282077 A1 | 10/2017 | De La Cruz |
| 2017/0282079 A1 | 10/2017 | De La Cruz |

OTHER PUBLICATIONS

"International Search Report and Written Opinion Issued in PCT Patent Application No. PCT/US19/029523", dated Jul. 4, 2019, 14 Pages.

\* cited by examiner

400

500

600

CONTEXTUAL IN-GAME ELEMENT RECOGNITION, ANNOTATION AND INTERACTION BASED ON REMOTE USER INPUT

BACKGROUND

In gaming applications, remotely located users may view a real-time gameplay of a video game player over a network connection, such as the Internet. The remotely located users may also interact with the video game player, for example by transmitting messages that the player may view or hear while playing the video game, enabling a social gaming experience among various users. In some scenarios, the messages may be displayed along with the gameplay on the player's display device. Such a social gaming experience may thereby permit a plurality of remotely located individuals to discuss, collaborate, and assist on solving game missions or the like.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, methods, and computer program products are provided for annotating a video frame generated by a video game. A video game model may be generated that associates element tags with elements of the video game. The video game model may be generated in a number of ways, including by supervised and/or unsupervised training. A video game overlay configured to display an overlaid annotation on a video frame may executed concurrently with the video game. The video game overlay may receive a remote user input from one or more remote devices over a network. The remote user input may be parsed, by applying the video game model, to extract an element tag corresponding to the video game. Using the video game model, an element of the video game corresponding to the element tag may be identified in the video frame. Based on the identified element in the video frame, the video frame may be annotated in various ways.

In this manner, a video game overlay may automatically parse a remote user input to identify and annotate elements of a video game currently being played by video game player in real-time. For instance, if a message was received indicating that the video game player should pass a soccer ball to a particular player, the video game overlay can identify the player, determine the location of the player on the video frame, and annotate the video frame to identify the player (e.g., by drawing an outline around the player). By automatically identifying and annotating elements in this manner, a video game player may readily view on-screen annotations corresponding to remote user inputs as they relate to an actual, real-time gameplay without having the need to separately read or listen to the remote user input. As a result, the user is less likely to become distracted by the remote user input and may maintain a better focus on playing the video game.

Further features and advantages, as well as the structure and operation of various example embodiments, are described in detail below with reference to the accompanying drawings. It is noted that the example implementations are not limited to the specific embodiments described herein. Such example embodiments are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the embodiments and to enable a person skilled in the pertinent art to make and use the example embodiments.

Figure 1:
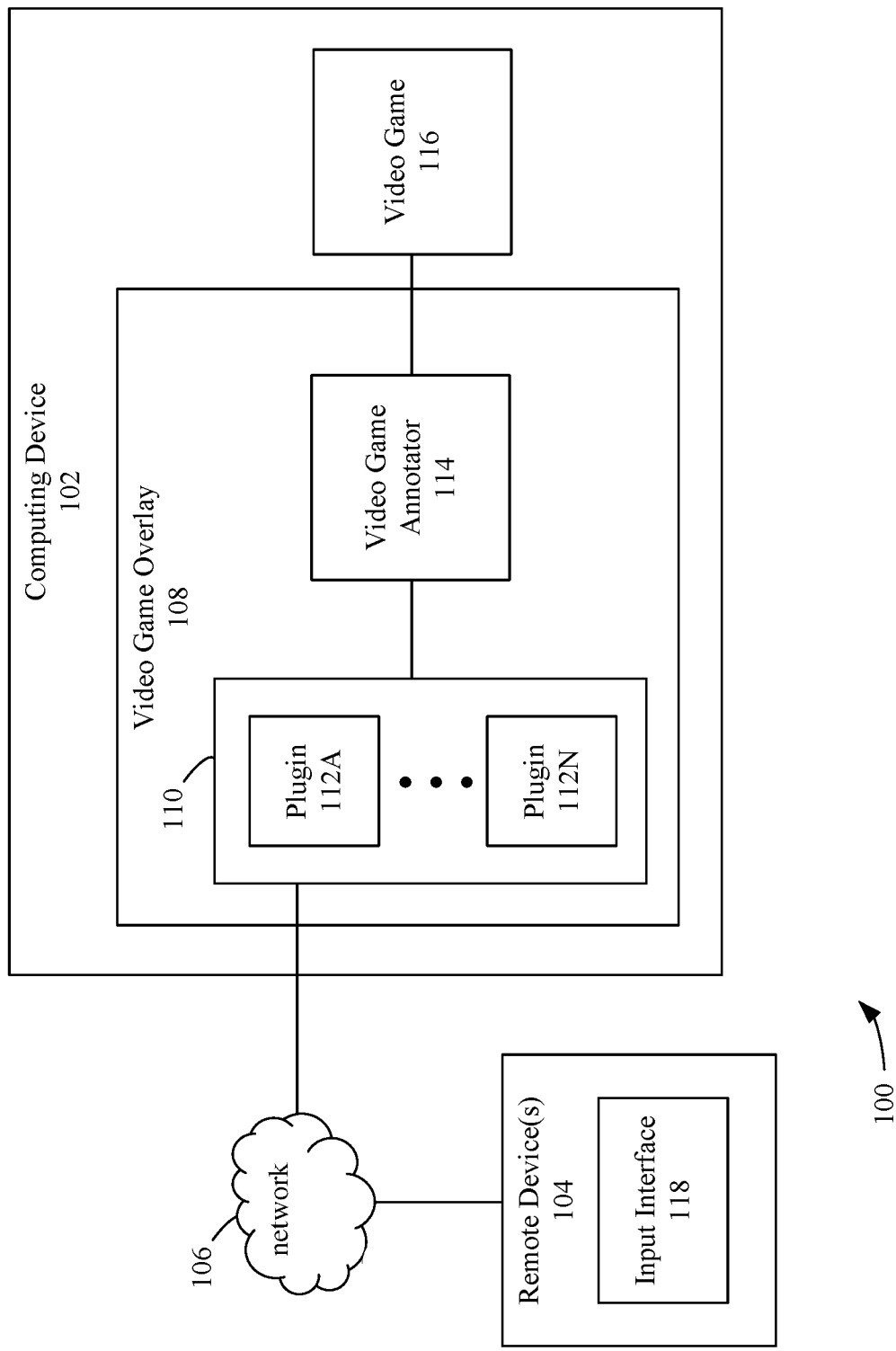
FIG. 1 shows a block diagram of a system for annotating a video frame generated by a video game, according to an example embodiment.

The features and advantages of the implementations described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example implementations. The scope of the present application is not limited to the disclosed implementations, but also encompasses combinations of the disclosed implementations, as well as modifications to the disclosed implementations. References in the specification to "one implementation," "an implementation," "an example embodiment," "example implementation," or the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of persons skilled in the relevant art(s) to implement such feature, structure, or characteristic in connection with other implementations whether or not explicitly described.

In the discussion, unless otherwise stated, adjectives such as "substantially" and "about" modifying a condition or relationship characteristic of a feature or features of an implementation of the disclosure, are understood to mean that the condition or characteristic is defined to within tolerances that are acceptable for operation of the implementation for an application for which it is intended.

Numerous example embodiments are described as follows. It is noted that any section/subsection headings provided herein are not intended to be limiting. Implementations are described throughout this document, and any type of implementation may be included under any section/subsection. Furthermore, implementations disclosed in any section/subsection may be combined with any other implementations described in the same section/subsection and/or a different section/subsection in any manner.

II. Example Implementations

As noted in the Background section above, in gaming applications, remotely located users may view a real-time gameplay of a video game player over a network connection, such as the Internet. The remotely located users may also interact with the video game player, for example by transmitting messages that the player may view or hear while playing the video game, enabling a social gaming experience among various users. In some scenarios, the messages may be displayed along with the gameplay on the player's display device. Such a social gaming experience may thereby permit a plurality of remotely located individuals to discuss, collaborate, and assist on solving game missions or the like.

However, the interaction between remote users and the video game player is typically limited. For instance, the player's display device typically only displays the content of the communicated message. Furthermore, if the remote user's message provided advice or a strategy hint for the video game player, the video game player still must direct his or her focus away from the game to read the message and then determine based on the message content alone how to carry out one or more actions in the video game or decide where to navigate. With many video games, the video game player may need to make such a determination nearly instantaneously. If the video game player is unable to make such determinations quick enough or even at all, the player may be unsuccessful at completing a video game mission or player's level of frustration may rise, despite being provided a hint or strategy message from a remote viewer. With many video games being increasingly complex or having constantly changing screens elements, the ability for a player to carry out actions based on a remote viewer's advice in real-time becomes increasingly difficult.

In addition, where a video game player is receiving messages from multiple remote viewers simultaneously, requiring the video game player to focus on multiple video game related elements at the same time (e.g., viewing a chat window providing an ongoing stream of incoming messages, listening to an incoming stream of messages, and playing the video game). In such cases, the video game player may find it even more difficult to process each incoming message while simultaneously playing the video game. If the interactive gaming experience becomes too overwhelming for a particular video game player (e.g., due to a graphical user interface presenting content in a manner that a player cannot easily process), the player may disable an interactive gaming functionality altogether, leading to a decreased gaming experience for the player as well as remote viewers.

Implementations described herein address these and other issues through a video game overlay executed concurrently with a video game for annotating a video frame generated by the video game. The video game overlay includes a receiver that receives a user input from a remotely located device over a network (e.g., via a plugin of the video game overlay). The video game overlay may also include a parser to extract an element tag from the user input by applying a video game model that associates element tags or labels with elements of the video game. Using the video game model, an element recognizer may analyze the video frame to identify an in-game element, such as a soccer player, of the video game corresponding to the extracted element tag. An annotation renderer may annotate the video frame based on the identified element, such as by causing the video game overlay to highlight the element (e.g., the soccer player) or draw an outline around the element.

In this way, the video game overlay may automatically display an annotation on the video game as an overlay (e.g., a superimposed image or the like) based on the content of a remote user input received from one or more remote users interacting with the video game player. For instance, the video game overlay can automatically determine to which in-game elements of a particular video game a remote user's input relates, identify such elements in the video frame, and present an on-screen indication to the video game player in real-time identifying that element. As a result, if a user is focused on playing a video game instead of reading or listening to messages from remotely located viewers, advice provided by the remote viewers relating to the actual real-time gameplay may be displayed as an overlay on the display device presenting the video game. In addition, the video game overlay may be simultaneously coupled to several remote services via different plugins, enabling the video game overlay to display annotations based on remote user inputs received from different remote services quickly (i.e., in real-time) and automatically.

This approach has numerous advantages, including but not limited to reducing the likelihood that a video game player will become distracted with messages from remotely located users, and enable annotations based on the content of those messages to be presented automatically on the video game player's screen as overlays. For example, the techniques described herein may process and analyze content derived from a remote user's input quickly (i.e., as soon as the input is received), and use the input to guide the video game player through annotations overlaid on actual video elements of the video game in real-time. Furthermore, by enabling a single video game overlay to interact with remote users via one or more receivers (e.g., plug-ins), the need for additional software or hardware is reduced, while simultaneously enhancing a gaming experience for the game player and remote viewers. In addition, utilization of a video game model that may be continuously trained based on elements in the video game enables the model to become more accurate over time, thereby improving the accuracy of the annotations that may be presented by the video game overlay.

Additionally, implementations described herein improve a graphical user interface by enhancing the interactive gaming experience for both remote viewers and the video game player. For example, by automatically presenting annotations to on-screen elements, the video game player may view information derived from the remote viewers' comment as it relates to the actual, real-time gameplay instead of reading the text of the remote viewer's comment. In this way, the graphical user interface may enable the video game player to more easily understand suggestions or advice from a remote viewer, while reducing the chances that the player becomes distracted. Still further, in systems where different processes may be executed in parallel, the video game overlay may determine and render annotations in parallel with the execution of the video game, enabling the video game to continue to present graphics to a user at high frame rates and/or without lag or delay. In other words, since the video game is not utilizing any resources to analyze content from various plugins and overlay content therefrom, the video game can continue to deliver a high-performance experience, while a separate video game overlay may use parallel resources to render annotations useful to a video game player on top of video frames generated by the video game.

Accordingly, implementations can provide at least the following capabilities pertaining to annotating a video frame generated by a video game: (1) a mechanism to automatically present an on-screen annotation to a video frame based on a remote user input; (2) a mechanism for enhancing a gaming experience for the game player and remote viewers by implementing a plurality of plug-ins for receiving user inputs across different remote services for which to present on-screen annotations; (3) a mechanism for implementing a video game model that may be continuously trained based on elements in a video game; (4) a mechanism for improving a graphical user interface in connection with a gaming experience, and (5) a mechanism for enabling a high-performance video game experience while simultaneously providing on-screen annotations.

Example implementations will now be described that are directed to techniques for annotating a video frame. For instance, FIG. 1 shows a block diagram of an example system 100 for annotating a video frame generated by a video game, according to an example implementation. As shown in FIG. 1, system 100 includes a computing device 102, a network 106, and one or more remote device(s) 104. Network 106 may comprise one or more networks such as local area networks (LANs), wide area networks (WANs), enterprise networks, the Internet, etc., and may include wired and/or wireless portions. Computing device 102 is communicatively connected to remote device(s) 104 via network 106. In an implementation, computing device 102 and remote device(s) 104 may communicate via one or more application programming interfaces (API).

Computing device 102 may be a device configured to output a video signal comprising one or more video frames to a display screen. Computing device 102 may comprise a video game console (e.g., a Microsoft Xbox® of any version, a Sony PlayStation® of any version, A Nintendo Wii®, NES, or Switch™ of any version, etc.), a desktop computer, a portable computer, a smartphone, a tablet, a wearable computing device, a head mounted gaming device, a mixed and/or virtual reality device (e.g., Microsoft HoloLens™), or any other processing device for executing a video game and outputting video frames generated by the video game to a display device. Although not shown in FIG. 1, a display device of computing device 102 may comprise any type of display suitable for receiving and displaying video frames generated by a video game. For instance, the display device may be a liquid crystal display, cathode ray tube display, light-emitting diode display, a plasma display, a display screen of a projector television, or any other type of display that may be coupled to computing device 102 through a suitable interface. The display device of computing device 102 may either be external to or incorporated in computing device 102. An example computing device that may incorporate the functionality of computing device 102 is discussed below in reference to FIG. 8.

As shown in FIG. 1, computing device 102 includes a video game overlay 108 and a video game 116. Video game overlay 108 is configured to provide an interactive overlay on video frames generated by video game 116. For example, video game overlay 108 may present one or more on-screen indications, messages, affordances, clues, or other information to be displayed as an overlay, or a superimposed image or graphic on a display device of computing device 102 that is displaying content from video game 116. In implementations, video game overlay 108 may be executed concurrently with video game 116 such that video game overlay may present overlaid information simultaneously with the real-time gameplay of video game 116. For example, video game overlay 108 may be configured as an application that may be executed concurrently with video game 116 on a common operating system. In other example embodiments, video game overlay 108 may be implemented as a shell-level or top-level application executable on an operating system such that it may present graphical objects or annotations as overlays. In another example, video game overlay 108 may implemented in an application such as Game Bar developed by Microsoft Corporation of Redmond, Wash.

Video game overlay 108 includes a remote device interface 110 and a video game annotator 114. Remote device interface 110 may comprise plugins 112A-112N. Plugins 112A-112N may be configured to receive information from one or more endpoints or remotely located sources (e.g., remote device(s) 104) over a network. For instance, plugins 112A-112N may correspond to a number of different services that enable remotely-located users to view the real-time gameplay of video game 116 over a network. Plugins 112A-112N may also enable remotely located users to transmit one or more messages to the video game player of video game 116 during the gameplay, such that the video game player can view such messages (e.g., via an on-screen indication or the like) or listen to such messages as the player is playing video game 116.

In some implementations, plugins 112A-112N may each correspond to a communication channel for communicating with an online or cloud-based service provided by one or more servers (not shown). For instance, plugins 112A-112N may enable video game overlay 108 to connect to a plurality of different gaming services that allow remote viewers (e.g., users of remote device(s) 104) connected to the same gaming services to interact with a video game player of video game 116. Some examples include interactive gaming services such as Discord® developed by Discord, Inc. of San Francisco, Calif., Twitch® developed by Twitch Interactive, Inc. of San Francisco, Calif., and Mixer™ developed by Microsoft Corporation of Redmond, Wash.

It is noted that video game overlay 108 is not limited to communicating with remote devices via one or more plugins. For instance, in other implementations, video game overlay 108 may include any other manner for communicating with another device over network 106, such as via standalone software executed on computing device 102, one or more APIs, or other software and/or hardware implemented in computing device 102 for enabling real-time interaction between a remote viewer and a player of video game 116. In some other implementations, video game overlay 108 may communicate with one or more remote devices via any type of direct connection or indirect connection (e.g., through an intermediary such as a server).

Note that the variable "N" is appended to various reference numerals for illustrated components to indicate that the number of such components is variable, with any value of 2 and greater. Note that for each distinct component/reference numeral, the variable "N" has a corresponding value, which may be different for the value of "N" for other components/reference numerals. The value of "N" for any particular component/reference numeral may be less than 10, in the 10s, in the hundreds, in the thousands, or even greater, depending on the particular implementation.

Video game 116 may include any type of video game executable or playable on computing device 102. Video game 116 may comprise any type of video game genre, such as sports, action, adventure, role playing, simulation, strategy, educational, etc. Video game 116 may comprise games of any level of player interaction (e.g., fast-action or fast-paced games, slow moving games, single-player games, multi-player games, etc.). As other examples, video game 116 may include games or activities such as card games (e.g., Solitaire), crossword puzzles, mathematical games, trivia games, family games etc. In implementations, video game 116 may be stored locally on computing device 102 or may be stored on a removable storage, such as a compact-disc (CD), a digital video disc (DVD), a Blu-Ray™ disc, or any other medium that may be accessed by computing device 102. In other implementations, video game 116 may be stored remotely (e.g., on a local or remotely-located server accessible via network 106) and/or streamed from a local or remote server.

Remote device(s) 104 include one or more remote devices of remote viewers interacting with a video game player of computing device 102. It is to be understood that system 100 may comprise any number of remote device(s) 104 and each remote device may be located in any one or more locations. Remote device(s) 104 may comprise a mobile device, including but not limited to a mobile computing device (e.g., a Microsoft® Surface® device, a personal digital assistant (PDA), a laptop computer, a notebook computer, a tablet computer such as an Apple iPad™, a netbook, etc.), a mobile phone, a handheld video game device, a wearable computing device, a head mounted gaming device, or a mixed and/or virtual reality device (e.g., Microsoft HoloLens™). Remote device(s) 104 may comprise a stationary device such as but not limited to a desktop computer or PC (personal computer), a video game console, a set-top box, a television, or a smart device, such as a voice-activated home assistant device. In implementations, remote device(s) 104 may comprise one or more output devices, such as a speaker and/or a display device (not shown) configured to output audio and/or video content representing the real-time gameplay of video game 116. In example embodiments, remote device(s) 104 may be coupled to remote device interface 110 via an appropriate plugin to interact with computing device 102 via network 106. In other implementations, remote device(s) 104 may interface with video game overlay via network 106 through a suitable API, and/or by other mechanisms, such as a web browser (e.g., Microsoft® Internet Explorer, Google® Chrome, Apple® Safari, etc.). Note that any number of plugins, program interfaces or web browsers may be present.

Remote device(s) 104 may also include an input interface 118 for receiving a user input. Input interface 118 may enable a user of remote device(s) 104 to interact with video game overlay 108 of computing device 102 in a number of ways. For instance, input interface 118 may comprise a keyboard input, a microphone, a camera, a touchscreen, a touch pad, or any other type of device for capturing a remote user input. Accordingly, a remote user input may be captured in any form, including audio, video, text, touchscreen, touchpad, stylus or pen-based inputs (e.g., Microsoft Windows® Ink), gesture-based inputs, etc. In examples, the remote user input may comprise any type of information (e.g., a message, a suggestion, or advice for video game player of video game 116, or any other information related to video game 116). Upon receiving information via input interface 118, remote device(s) 104 may transmit such information over network 106 to video game overlay 108 through an appropriate communication channel, as described above. As a non-limiting illustrative example, a remote user may verbally indicate that the video game player should pass a ball to a certain player. Upon input interface 118 capturing such an input, remote device 104 may transmit the message (as audio and/or text) to video game overlay 108, thus enabling the remote user to interact with a video game player of video game 116 in real-time.

In accordance with implementations, video game annotator 114 may be configured to present one or more annotations to a video frame generated by video game 116. For instance, video game annotator 114 may present content extracted from a remote user input (e.g., a message) received from one of remote device(s) 104 as an on-screen annotation. In example embodiments, video game annotator 114 may be configured to apply a machine-learning based video game model to analyze the remote user input to identify element tags associated with video game 116, identify elements corresponding to the element tags in a video frame generated by video game 116, and annotate the video frame in one or more ways. In this manner, as the video game player is playing video game 116, video game annotator 114 may utilize remote user input received over a number of different sources (e.g., plugins 112A-112N) to generate interactive annotations to a video frame corresponding to the real-time gameplay of video game 116.

Figure 2:
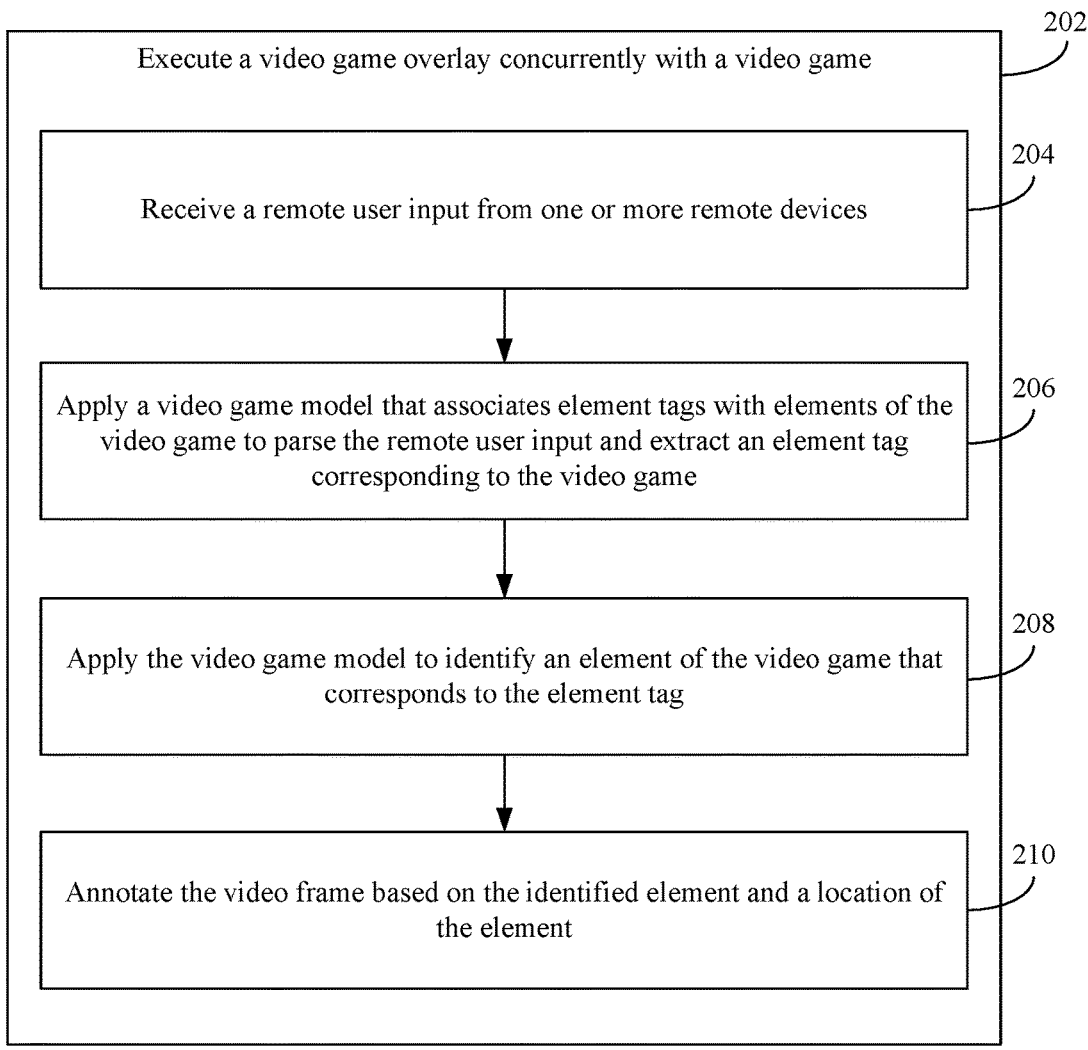
FIG. 2 shows a flowchart of a method for annotating a video frame generated by a video game, according to an example embodiment.

Accordingly, in implementations, annotating a video frame generated by a video game may be achieved. Video game annotator 114 may annotate a video frame of video game 116 in various ways. For example, FIG. 2 shows a flowchart 200 of a method for annotating a video frame, according to an example embodiment. In an implementation, the method of flowchart 200 may be implemented by video game annotator 114. FIG. 2 is described with continued reference to FIG. 1. Other structural and operational implementations will be apparent to persons skilled in the relevant art(s) based on the following discussion regarding flowchart 200 and system 100 of FIG. 1.

Flowchart 200 begins with step 202. In step 202, a video game overlay is executed concurrently with a video game. For instance, with reference to FIG. 1, video game overlay 108 may be executed concurrently with video game 116. In implementations, upon launching video game 116, video game overlay 108 may be executed automatically (e.g., without any further user input) or may be executed manually by a user. Video game overlay 108 may also be selectively launched based on determining that a particular game has been executed, or a game falling within a particular game genre (e.g., sports games) has been executed. In some other implementations, a user of computing device 102 may specify, via a user interface (not shown) one or more video games that cause video game overlay 108 to be executed concurrently.

Video game overlay 108 may be configured as a separate application or process than video game 116 such that it is launched and terminated without disrupting the execution of video game 116. In other implementations, video game overlay 108 may be implemented within video game 116 rather than as a separate application or process. In accordance with implementations, video game overlay 108 may be configured to provide an on-screen overlay (e.g., a graphical or other annotation) displayed in a superimposed manner on one or more video frames generated by video game 116. For instance, video game annotator may receive a remote user input from one or more plugins 112A-112N and display such input as an overlay on a display screen that is simultaneously displaying content from video game 116.

Figure 3:
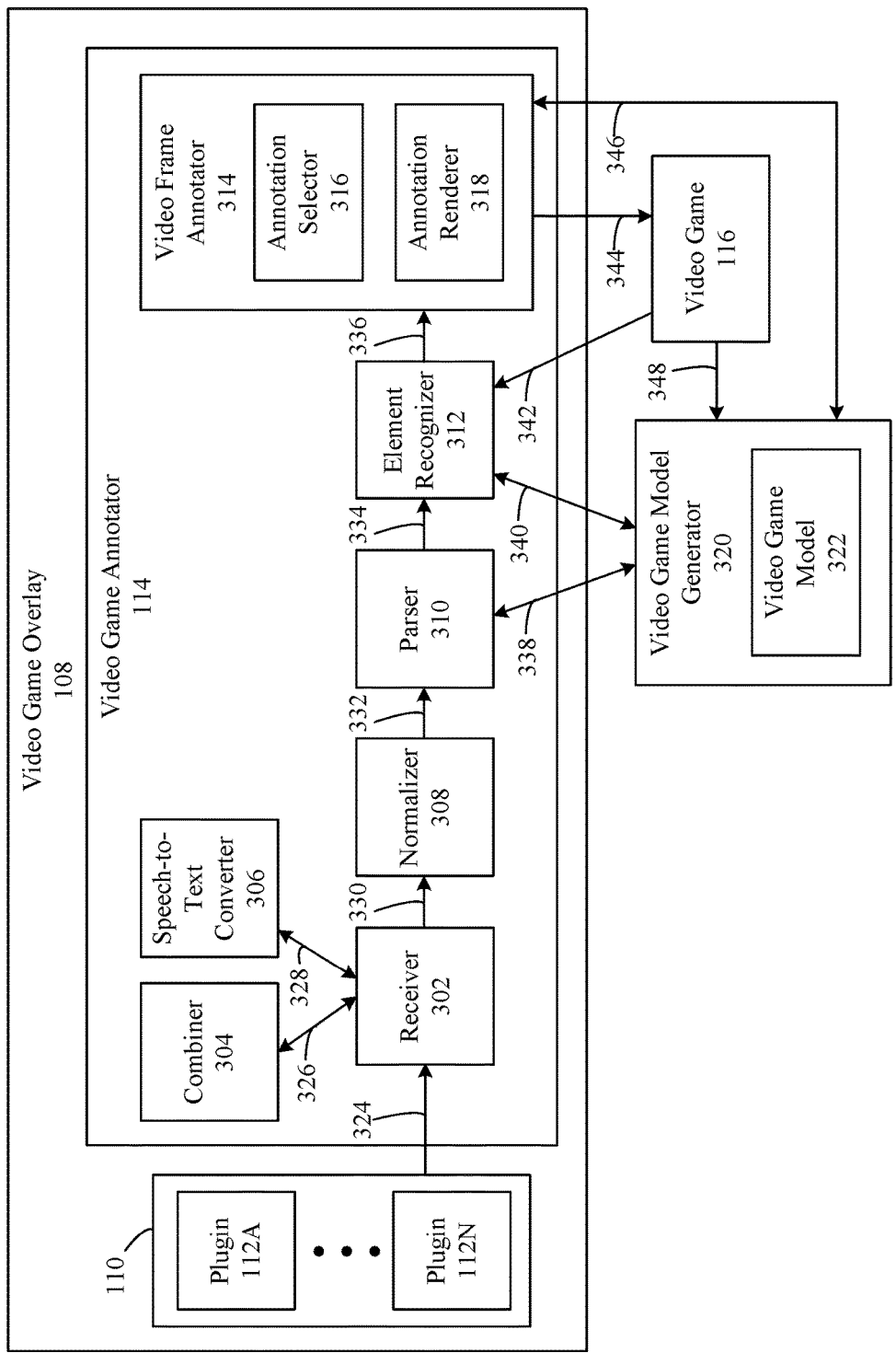
FIG. 3 shows a block diagram of a video game overlay, according to an example embodiment.

In step 204, a remote user input is received from one or more remote devices. For instance, with reference to FIG. 1, video gave overlay annotator 114 may receive a remote user input from one or more remote device(s) 104 via network 106. In implementations, video game annotator 114 may receive such input from one or more plugins 112A-112N, each of which may correspond to a remote service that one or more remote device(s) 104 are communicatively coupled. Step 204 may also be performed in accordance with other implementations. For instance, FIG. 3 shows a block diagram of video game overlay 108 coupled to a video game model generator 308 and a video game 116. As shown in FIG. 3, video game overlay 108 includes remote device interface 110 as described previously, and video game annotator 114. Video game annotator 114 includes a receiver 302, a combiner 304, a speech-to-text converter 306, a normalizer 308, a parser 310, an element recognizer 312, and a video frame annotator 314.

In accordance with step 204, receiver 302 may be configured to receive a remote user input from one of remote device(s) 104 via network 106. In implementations, receiver 302 may receive 324 the remote user input via one or more of plugins 112A-112N, or any other suitable manner for receiving a user input from a remotely located device. Receiver 302 may receive input from any number of plugins. In implementations, receiver 302 may be configured to receive remote user input from a plurality of different plugins (e.g., plugins corresponding to different remote services) concurrently or simultaneously. As a result, since receiver 302 may receive user input from a variety of different plugins, receiver 302 may act as a universal interface between the different remote services and video game annotator 114. In this way, a separate video game overlay need not be installed for each remote service, but rather a single video game overlay 108 executed concurrently with video game 116 may enable communication across a plurality of desired remote services and users through activating, installing, or executing one or more of plugins 112A-112N.

In some example embodiments, receiver 302 may be configured to receive remote user inputs in a variety of forms. For example, input interface 118 of remote device(s) 104 may obtain a remote user input in one or more forms, including a voice input (e.g., via a microphone), a text input (e.g., via a keyboard), a touch screen input (e.g., via a stylus, a pen-based input, or a user-initiated touching action), or a pointing device input (e.g., a mouse or other pointing device). In some implementations, where the remote user input comprises a voice input, speech-to-text converter 306 may receive 328 the voice input and automatically convert the voice input into a text input. For instance, using one or more speech conversion algorithms as will be appreciated to one skilled in the art, speech-to-text converter 306 may convert a remote user input captured by a microphone, for example, into a word or phrase. Similarly, although not shown herein, a converter may convert a touch input into a text input, for instance, by implementing one or more optical character recognition (OCR) techniques appreciated by those skilled in the art. In this manner, remote user inputs obtained by different input interfaces may be converted into text prior to one or more other processing steps as described herein.

In some example embodiments, normalizer 308 may be configured to obtain 330 the remote user input and normalize the input. For instance, normalizer 308 may perform one or more modifications to the remote user input (or converted remoted user input as described above) such that the input is in an appropriate form for subsequent processing. In an example embodiment, normalizing the remote user input may include removing all uppercase characters and/or removing all punctuation. Normalizer 308 may also normalize a remote user input based on one or more lemmatization or truncation techniques, such as analyzing words contained within the remote user input and removing inflectional word endings to obtain a base or dictionary form of a word. In other examples, normalizer 308 may remove other extraneous words or phrase, correct misspellings, or perform similar modifications, alterations to the remote user input.

In step 206, a video game model is applied that associates element tags with elements of the video game to parse the remote user input and extract an element tag corresponding to the video game. For example, with reference to FIG. 3, video game model generator 320 may generate a video game model 322 that associates element tags (e.g., labels) with elements of video game 116. In implementations, video game model 322 comprises a machine-learning based model for each video game that may be trained in a number of ways, including both supervised and unsupervised training, as will be described in greater detail below. As video game 116 is played more, video game model 322 may obtain additional training data, thus enhancing the accuracy of video game model 322 over time. In an example, video game model 322 may associate a particular graphical object (e.g., a sports jersey identifier or the face of a sports player) with an element tag (e.g., the name of the sports player in video game 116). In another example, video game model may associate other elements, such as landscaping (e.g., trees) or geographical objects (locations in a game) with an appropriate element tag. Video game model 322 may comprise a machine-learning based model for each different video game 116. For instance, because video games typically comprise different content, video game model 322 may comprise a unique association of element tags to video game elements for each video game 116.

Referring back to step 206, parser 310 may be configured to apply video game model 322 to parse the remote user input and extract an element tag corresponding to video game 116. For example, based on the particular video game being played, video game model 322 may identify each possible element tag (e.g., a label such as a text label) associated with elements of video game 116. Parser 310 may receive 332 the remote user input and parse the input to determine whether the input comprises an element tag corresponding to video game 116. In implementations, parser 310 may extract an element tag from remote user input by performing a text search of the remote user input for each possible element tag identified by applying 338 video game model 116. It is noted that parser 310 is not limited to extracting a single element tag from each remote user input, but may extract a plurality of element tags in any given input. For instance, as a non-limiting illustrative example, if a remote user was viewing a real-time gameplay of a soccer video game and verbally indicated that the video game player should "pass the ball to Cristiano," parser 310 may apply all possible element tags of the particular video game, and extract from the remote user input element tags including "ball" and "Cristiano." In another example, if video game 116 was a card game (e.g., Solitaire) and a remote user input comprised a suggestion relating to the "six of hearts," parser 310 may determine, by applying video game model 322, that "six" and "hearts" (or the combination thereof) are element tags, and extract such elements tags from the remote user input.

In step 208, the video game model is applied to identify an element of the video game that corresponds to the element tag. For instance, with continued reference to FIG. 3, element recognizer 312 is configured to receive 334 the element tag extracted by parser 310 and apply video game model 322 to identify an in-game element of video game 116 corresponding to the element tag. Element recognizer 312 may identify an in-game element of video game 116 corresponding to the extracted element tag in a number of ways. For instance, element recognizer 312 may provide 340 the extracted element tag to video game model 322 to identify information associated with the corresponding element. Video game model 322 may return information associated with an extracted element tag by identifying a graphical object (e.g., a particular face of a sports player, a ball, a landscaping object, etc.), a word or phrase (a player name, a number), or any other indicator associated with the tag.

In implementations, using the information associated with the element returned by video game model 322, element recognizer 312 may obtain 342 a video frame generated by video game 116 and analyze the video frame to identify the element corresponding to the extracted element tag. The video frame may comprise any format, including but not limited to a still image, bitmap file, jpeg file, portable network graphics (png) file, etc. In other implementations, element recognizer 312 may identify elements in a plurality of video frames generated by video game 116 (e.g., a stream of video frames).

Accordingly, upon applying model 322 to identify elements corresponding to extracted element tags, element recognizer 312 may analyze a video frame to identify whether such elements are present during an actual gameplay. Element recognizer 312 may identify (e.g., search) for elements in a video frame using any suitable image analysis algorithm, OCR algorithm, or any other technique (or combination thereof) as appreciated and understood by those skilled in the art to locate objects. For instance, continuing with a prior illustrative example, if the extracted element tags were "ball" and "Cristiano," element recognizer 312 may apply model 116 for the particular sports game being played to identify elements associated with each element tag, and analyze a video frame of video game 116 to identify such elements in the video frame by searching for a ball, jersey number, name, a position of the player on a field or court, etc. Because element recognizer 312 is executed concurrently with video game 116, identification of such elements on a video frame of the video game may be performed in real-time or near real-time.

In implementations, element recognizer 312 may also be configured to identify a location of the identified element. Element recognizer 312 may identify a location in a number of ways. For example, a location of an identified element may be based on a virtual location on the image frame. Element recognizer 312 may identify a relative location on an image frame using one or more coordinates representing the location of the identified element in the frame. Element recognizer 312 may identify a center of the identified object on the video frame, or identify a plurality of coordinates representing an outline or a boundary of the identified object.

In some other implementations, a location of an identified element may be based on video game model 322. For example, video game model 322 may be trained based on a video game map. In such instances, video game model 322 may be configured to identify a location of one or more elements in video game 116 based on a location of the elements within video game 116. Accordingly, upon parser 310 extracting an element tag from remote user input, element recognizer 312 may apply video game model 322 to identify where the element corresponding to the element tag may be present or found in the video game and compare that identified location with a present location as indicated by the most recent video frame of video game 116 (e.g., based on a miniature map present in on a video frame or based on identifying one or more other elements in the video frame to infer a current location). In another example, such as where video game 116 is a sports game, video game model 322 may further be trained based on positions played by one or more sports players. For instance, where element recognizer 312 is unable to identify an element (e.g., a specific sports player) in a video frame corresponding to the element tag, element recognizer 312 may apply video game model 322 to determine or infer a likely location of the sports played based on the positioned played, even if the player is not identified in the video frame.

It is also noted that element recognizer 312 may also determine a confidence value associated with an identified element. For instance, element recognizer 312 may analyze a video frame to identify an in-game element as described herein and further calculate a measure of confidence associated with the identification. In implementations, if the confidence value is above a threshold, an annotation for the element may be overlaid on the video frame. If the confidence value is below a threshold, an annotation may not be applied to the video frame. The confidence value may also be configured based on a user input. For instance, a video game player may set a higher confidence value for more accurate on-screen annotation.

In step 210, the video frame is annotated based on the identified element and a location of the element. With reference to FIG. 3, video frame annotator 314 may obtain 336 an identification of an in-game element and a location of the element from element recognizer 312 and provide 344 an on-screen annotation to a video frame of video game 116 based on the element and location. For instance, annotation selector 316 may select an appropriate annotation in a number of ways, as described in more detail below, and annotation renderer 318 may cause the annotation to be overlaid on a video frame generated by video game 116. Annotation renderer 318 may be configured to render any type of on-screen annotation on the video frame, including but not limited to highlighting an element, outlining an element (e.g., a silhouette), displaying a shape (e.g., a box, circle, star, etc.) around an element, and/or displaying a visual indication of a direction of the element (e.g., an arrow or other pointer). An annotation need not be overlaid on top of or around an identified element but may also be displayed near the identified element (e.g., above, below, etc.). An annotation rendered on a video frame may be opaque or translucent, may comprise a single color, multiple colors, or change colors when the annotation is rendered on successive video frames. In other implementations, an annotation may flash or change in size, thickness, or type to cause the annotation to become more or less visible during gameplay.

The examples are not limited herein, and any other type or format of annotating an element, or combination thereof, is contemplated.

In example embodiments, annotation renderer 318 is configured to render an annotation as an overlay on the video frame generated by video game 116 such that a display device of computing device 102 displays both the video frame of the video game 116 and the overlaid annotation simultaneously. As discussed earlier, an annotation may be displayed in a single video frame or may be refreshed across multiple (e.g., successive) video frames. In some implementations, an annotation may be displayed on one or more successive video frames until the identified element for which an annotation is rendered is no longer present on a video frame. In another example, an annotation may be displayed until a user performs a certain action in response to the annotation (e.g., by passing a ball to a highlighted player), performs an action not consistent with the annotation, ignores the annotation, or dismisses the annotation. In examples where an annotation may be displayed for a plurality of video frames, one or more of the successive video frames may be analyzed to identify the element and its location in a similar manner as described above (e.g., with respect to step 208). For instance, each video frame generated by video game 116 may be separately processed to identify an element corresponding to an element tag, and annotation renderer 318 may be configured to annotate each video frame in which the identified element is present. In other examples, annotation renderer 318 may be configured to render an annotation by tracking a movement of the identified element in the successive video frames using any suitable object recognition and/or object tracking algorithm.

Although it is described herein that annotation renderer 318 may display an annotation on a video frame generated by video game 116, implementations are not limited to rendering a single annotation on the video frame. It will be understood that any annotation renderer 318 may render any number and type of annotations on a video frame simultaneously (e.g., by annotating a ball and a player in a video frame). Furthermore, annotation renderer 318 is not limited to rendering annotations based a single remote user input. Rather, because receiver 302 may receive remote user inputs from a variety of different plugins 112A-112N or remote services, annotation render 318 may render appropriate annotations simultaneously on a video frame for a plurality of elements corresponding to element tags identified in the various user inputs.

Figure 4:
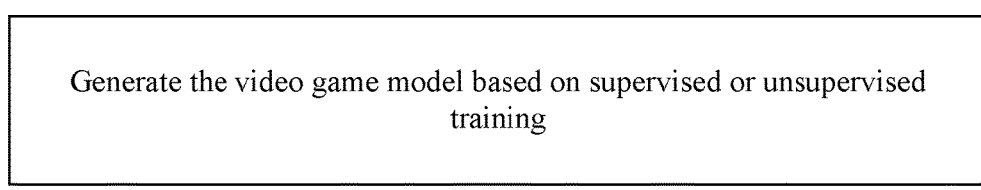
FIG. 4 shows a flowchart of a method for generating a video game model, according to an example embodiment.

As described above, in examples, video game model 322 may be trained to associate element tags with elements of video game 116 in various ways. For instance, FIG. 4 shows a flowchart 400 of a method for generating a video game model, according to an example embodiment. In an example, the method of flowchart 400 may be implemented by video game model 322, as shown in FIG. 3. Other structural and operational implementations will be apparent to persons skilled in the relevant art(s) based on the following discussion regarding flowchart 400.

Flowchart 400 begins with step 402. In step 402, a video game model is generated based on supervised or unsupervised training. For instance, with reference to FIG. 3, video game model 322 may be generated by via supervised training, unsupervised training, or both. Supervised training may include training video game model 322 based on one or more user inputs. In one implementation, user(s) may train video game model 322 by manually associating an element tag (e.g., a label) with an element of video game 116. For example, a user may identify an association between a name of a sports player (i.e., the element tag for the player) and the player within video game 116 (i.e., the in-game element corresponding to the player). In another example, a user may train video game model 322 based on a location (e.g., a bunker or a lake) within a video game and an element tag corresponding to the location. In a further implementation, video game model 322 may further be trained based on one or more in-game objects at or near such a location within the video game (e.g., a weapon or ammunition near a lake).

Associations for training video game model 322 may be made by selecting an element on a video frame and identifying a tag for the element via any suitable user input, such as a touchscreen, keyboard, voice input, pointing device, etc. It is noted that example embodiments are not limited to training video game model 322 based on a single user input. Rather, video game model 322 may be trained based on any number of users, such as a player currently playing video game 116 and one or more users of remote device(s) remotely viewing video game 116 simultaneously or at different times. In another implementation, a designer (e.g., a game designer, a game overlay designer, a plugin designer, etc.) may also train video game model 322 through any suitable method of supervised training as discussed herein.

In other implementations, video game model 322 may be trained based on unsupervised training. For example, video game model 322 may learn or infer mappings between element tags and elements of video game 116 automatically during gameplay. In implementations, video game model 322 may obtain 348 one or more video frames generated by video game 116 (e.g., a raw image such as a bitmap, png, etc.) to identify associations between elements in the video frame and element tags. In one implementation, unsupervised training of video game model 322 may be based on one or more data clustering algorithms, image recognition techniques, OCR techniques, etc. In some other examples, elements of a video game may be tagged based on data accessed from an online or offline element repository. For instance, an element repository (e.g., existing on the cloud or other remotely located device or server(s)) may be used to map elements to element tags. For instance, elements of a video game (e.g., card suits, players, landscape objects, etc.) may be automatically tagged based on obtaining associations from an element repository. In another implementation, the element repository may comprise an image repository configured to associate labels (e.g., element tags) and graphical objects (e.g., elements), a video game guide identifying one or more objects, players, locations, etc. of a video game, or any other data source that may map images that may found in video games to text-based labels. Based on identifying an association from an element repository, video game model 322 may infer that a particular element of video game 116 should be associated with a particular element tag.

In yet another implementation, video game model 322 may be trained based on element and element tag associations from one or more other video games. In an example, where a video game model 322 for a particular video game associates an element (e.g., a tree, a player, etc.) with an appropriate element tag based on any of the supervised or unsupervised training techniques described herein, video game model 322 may train similar elements in different games based on the learned element and element tag associations.

Accordingly, video game model 322 may be trained based on supervised training or unsupervised training as discussed above. It is noted that video game model 322 may also be trained based on a combination of supervised and unsupervised training. For instance, certain elements of a video game may be manually associated with element tags, while video game model 322 may be trained to associate elements and element tags automatically for other elements in an unsupervised manner.

Video game model 322 may be generated and/or stored remotely, such as on one or more cloud-based servers. In other implementations, video game model 322 may be generated and/or stored locally (e.g., on computing device 102).

Figure 5:
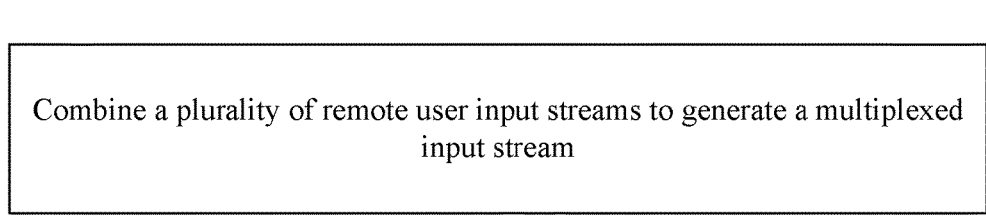
FIG. 5 shows a flowchart of a method for generating a multiplexed remote user input stream, according to an example embodiment.

As described above, in examples, video game annotator 114 may be configured to receive a plurality of remote user inputs. For instance, FIG. 5 shows a flowchart 500 of a method for generating a multiplexed remote user input stream, according to an example embodiment. In an example, the method of flowchart 500 may be implemented by combiner 304, as shown in FIG. 3. Other structural and operational implementations will be apparent to persons skilled in the relevant art(s) based on the following discussion regarding flowchart 500.

Flowchart 500 begins with step 502. In step 502, a plurality of remote user input streams is combined to generate a multiplexed remote user input stream. For instance, with reference to FIG. 3, receiver 302 may receive a remote user input as a plurality of different input streams via plugins 112A-112N. As discussed previously, in examples, plugins 112A-112N may each correspond to different remote services for enabling remote device(s) 104 to interact with video game overlay 108. In implementations, combiner 304 may be configured to obtain 326 the plurality of remote user input streams received via plugins 112A-112N and combine the streams to generate a single multiplexed remote user input stream. For example, combiner 304 may multiplex remote user input streams corresponding to different remote services (e.g., different remote users) into a single input stream. In another implementation, combiner 304 may be configured to combine different types of remote user inputs, such as a text input and a voice input, into a single text input stream. Combiner 304 may further be configured to assign a priority or weight to one or more remote user inputs received by receiver 304 in generating a multiplexed input stream. For example, combiner 304 may prioritize or assign a higher weight to inputs received via certain plugins or from certain remote users. In another example, where a video game player of video game 116 prefers to render annotations associated with certain plugins or remote users, combiner 304 may generate the multiplexed input stream comprising the inputs from only the specified plugins or remote users.

In some implementations, the single multiplexed remote user input may comprise a predetermined format. For instance, combiner 304 may convert the form, structure, and/or content of one or more remote user inputs received via plugins 112A-112N to conform to a format of the single multiplexed remote user input. As a result, subsequent processing of the remote user inputs received via plugins 112A-112N, for instance by normalizer 308, parser 310, element recognizer 312, and video frame annotator 314, may be performed on a single input stream rather than multiple discrete input streams. By annotating a video game based on a single input stream, less resources and processing capabilities are needed, the annotation generation may be simplified, and duplicative annotations may be avoided (e.g., where multiple remote users provide a similar recommendation for the video game player).

Figure 6:
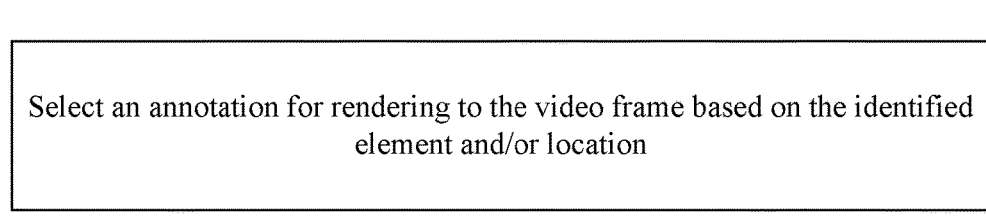
FIG. 6 shows a flowchart of a method for selecting an annotation for rending to a video frame, according to an example embodiment.

As described above, in examples, video frame annotator 314 may annotate a video frame of a video game in a variety of ways. For instance, FIG. 6 shows a flowchart 600 of a method for selecting an annotation for rending to the video frame, according to an example embodiment. In an example, the method of flowchart 600 may be implemented by annotation selector 316 and annotation renderer 318, as shown in FIG. 3. Other structural and operational implementations will be apparent to persons skilled in the relevant art(s) based on the following discussion regarding flowchart 600.

Flowchart 600 begins with step 602. In step 602, an annotation is selected for rendering to the video frame based on the identified element and/or a location of the element. For example, with reference to FIG. 3, annotation selector 316 may select an appropriate annotation based on the element identified by element recognizer and/or a location of the element. In implementations, each in-game element identified by element recognizer 312 may be configured to have a different type of annotation associated with the element, and/or may comprise one or more types of contextual based annotations. Accordingly, annotation selector 316 may select an appropriate element based on a type and/or context of an identified element, such as by selecting a silhouette or an outline when the identified element is a sports player or other object, or a directional indication where the element is based on a location within video game 116. In some implementations, annotation selector 316 may apply 346 video game model 322 to select an appropriate annotation based on the identified element.

As described, annotation selector 316 may select a number of various types of annotations for annotation renderer 318 to render on a video frame. For instance, FIGS. 7A-7D depict illustrative on-screen annotations rendered by annotation renderer 318. FIGS. 7A-7D comprise a display device 702 of a computing device (e.g., computing device 102) on which video game overlay 108 and video game 704 are concurrently executed. Display device 702 may display a video game 704, similar to video game 116 described with reference to FIGS. 1 and 3, along with one or more annotations generated by video game overlay 108.

Figure 7A:
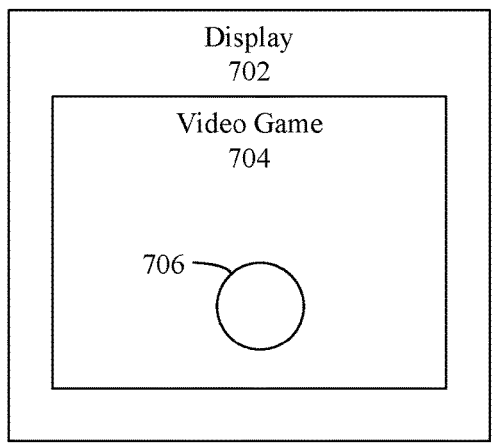
FIGS. 7A-7D show example annotations for rendering to a video frame of a video game, according to an example embodiment.

FIG. 7A, for example, illustrates an overlay comprising a shape 706 surrounding an element. Although depicted in FIG. 7A as a circle, shape 706 may comprise any other shapes, including but not limited to a triangle, rectangle, square, oval, star, etc. In some implementations, annotation selector 316 may select an appropriate shape based on a shape of the identified element (e.g., annotation selector 316 may select a circle if an identified element is a soccer ball).

Figure 7B:
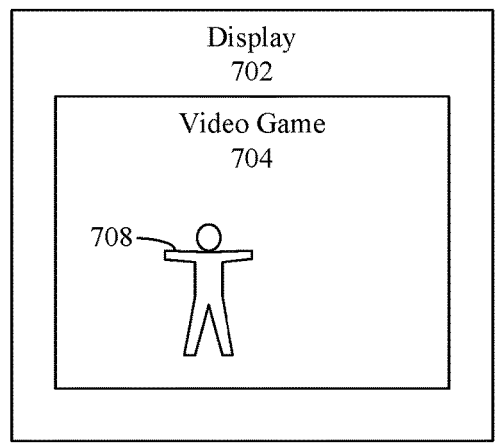

FIG. 7B illustrates an instance where annotation selector 316 selects an outline 708 as an annotation for an element. An outline may comprise an outline or a silhouette of an identified element, such as an outline of a human. Although FIG. 7B illustrates a human outline as an annotation, annotation selector 316 may select any other outline based on the identified element, such as an outline of a tree, a football, an aircraft, a vehicle, or any other element identified in video game 704.

Figure 7C:
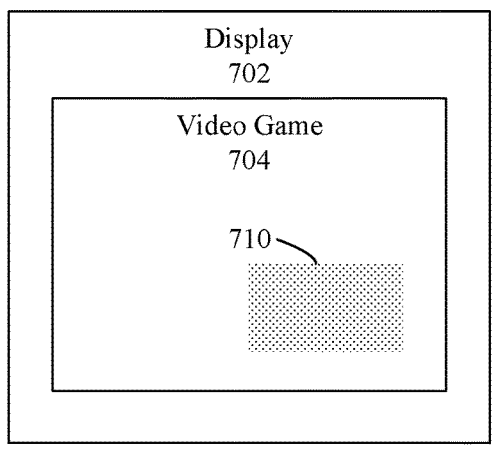

As shown in FIG. 7C, annotation selector 316 may select a highlight 710 as an on-screen annotation. In examples, highlight 710 may be overlaid on a single element or a grouping of elements in video game 704. Furthermore, highlight 710 may be used in conjunction with one or more other annotation types described herein. For instance, a highlight may be overlaid in a particular shape or in the form of an outline of an element.

Figure 7D:
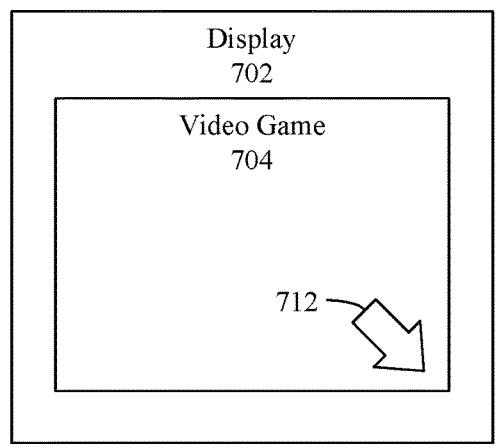

FIG. 7D shows another illustrative annotation according to an example embodiment. In FIG. 7D, annotation selector 316 may select an annotation comprising a visual indication 712 of a direction to the identified element. For example, where video game model 322 is configured to generate a model based on an entire video game map, along with locations of one or more element locations based on the video game map, element recognizer 312 may determine a direction a video game player should navigate to arrive at the identified element. Accordingly, in implementations, annotation selector 316 may select a visual indication 712 of direction to the element, such as an arrow or other pointer. Visual indication 712 may also comprise other types of indications not illustrated in FIG. 7D, such as an annotation (e.g., a dot or blinking object) on a miniature map of video game 704 that may be illustrated near a corner of the video frame. In a further implementation, annotation selector 316 may be configured to select a different annotation upon the video game player arriving at the identified location in video game 704, such as by overlaying a flashing box, shape, etc. over an element (e.g., a weapon or ammunition to pick up) at the location.

In some other examples, annotation selector 316 may change a color an annotation, change a size of an annotation, flash an annotation, etc. in one or more video frames in which an identified element is to be annotated. In some other example embodiments, annotation selector 316 may change from one type of annotation to another type of annotation. As an example, where an identified element moves outside of a video frame, annotation selector 316 may change an annotation type from one type (e.g., an outline) to another type (e.g., an arrow) indicating that the element may be located in a certain direction off the screen.

It is contemplated herein that any other annotations, including those not shown in FIGS. 7A-7D, may be overlaid on a video frame, including but not limited to on-screen indications, messages, affordances, clues, or other information, and any combination of annotations may be overlaid on a video frame for one or more identified elements. In other example embodiments, annotation selector 316 may select a raw remote user input to be presented as an overlay. For instance, a user of remote device 102 may provide an input using a pen, stylus, touchscreen, or the like, as an on-screen annotation to a remotely viewed video game. As one example, a remote user may draw or type a collection of lines, shapes, arrows, text, etc. on the remotely viewed screen that the remote user may wish to share with the video game player of computing device 102. In such instances, annotation selector 316 may select the raw remote user input (e.g., the lines, shapes, arrows, text, etc. drawn or inputted by the remote user) to be displayed as an overlay by annotation renderer 318 on display 702. In other implementations, the video game player playing video game 704 may similarly use one or more input devices to draw or type on-screen annotations that the player desires to share with remote devices for even further enhanced interaction and collaboration between the video game player and remote users.

In yet another implementation, annotation selector 316 may determine not to select an annotation for a particular element. As one example, if a plurality of other annotations is to be rendered on a video frame, annotation selector 316 may determine not to annotate a particular identified element to minimize distractions to a video game player. In another example, annotation selector 316 may determine not to select an annotation for a particular identified element if an associated confidence score is below a threshold.

In yet another example implementation, annotation selector 316 may select an annotation, a size, color, thickness etc. associated with the annotation, or determine not to select an annotation for an identified element based on a number of other factors, such as a video game player's progress in video game 704 and/or an expression associated with the video game player. For instance, if a video game player is successfully completing missions in a video game, scoring points in a sports game, otherwise performing at a satisfactory level while playing video game 704, annotation selector 316 may infer that the video game player may desire annotations to be selected and displayed in a less conspicuous manner and/or not displayed at all. In other examples, if a video game player is having difficulty in video game 704, annotation selector 316 may select annotations to be displayed that the video game player is less likely to miss (e.g., by selecting an annotation that may be larger, brighter, more conspicuous, etc.).

Similarly, annotation selector 316 may determine, based on a facial expression, verbal expression, or other emotion or expression captured via a camera and/or microphone whether an annotation should be selected for overlaying on display 702. For instance, if a video game player is focused and/or content, annotation selector 316 may determine not to select an annotation or select a less conspicuous annotation. Conversely, if the video game player is frustrated or sad based, annotation selector 316 may determine that the video game player would benefit from viewing a more conspicuous annotation.

III. Example Computer System Implementation

One or more of the components of computing device 102, remote device(s) 104, video game overlay 108, video game 116, video game model generator 320, video game 704, and one or more steps of flowcharts 200, 400, 500, and 600 may be implemented in hardware, or hardware combined with software and/or firmware. For example, one or more of the components of computing device 102, remote device(s) 104, video game overlay 108, video game 116, video game model generator 320, video game 704, and one or more steps of flowcharts 200, 400, 500, and 600 may be implemented as computer program code/instructions configured to be executed in one or more processors and stored in a computer readable storage medium.

In another implementation, one or more of the components of computing device 102, remote device(s) 104, video game overlay 108, video game 116, video game model generator 320, video game 704, and one or more steps of flowcharts 200, 400, 500, and 600 may also be implemented in hardware that operates software as a service (SaaS) or platform as a service (PaaS). Alternatively, one or more of the components of computing device 102, remote device(s) 104, video game overlay 108, video game 116, video game model generator 320, video game 704, and one or more steps of flowcharts 200, 400, 500, and 600 may be implemented as hardware logic/electrical circuitry.

For instance, in an implementation, one or more of the components of computing device 102, remote device(s) 104, video game overlay 108, video game 116, video game model generator 320, video game 704, and one or more steps of flowcharts 200, 400, 500, and 600 may be implemented together in a system on a chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
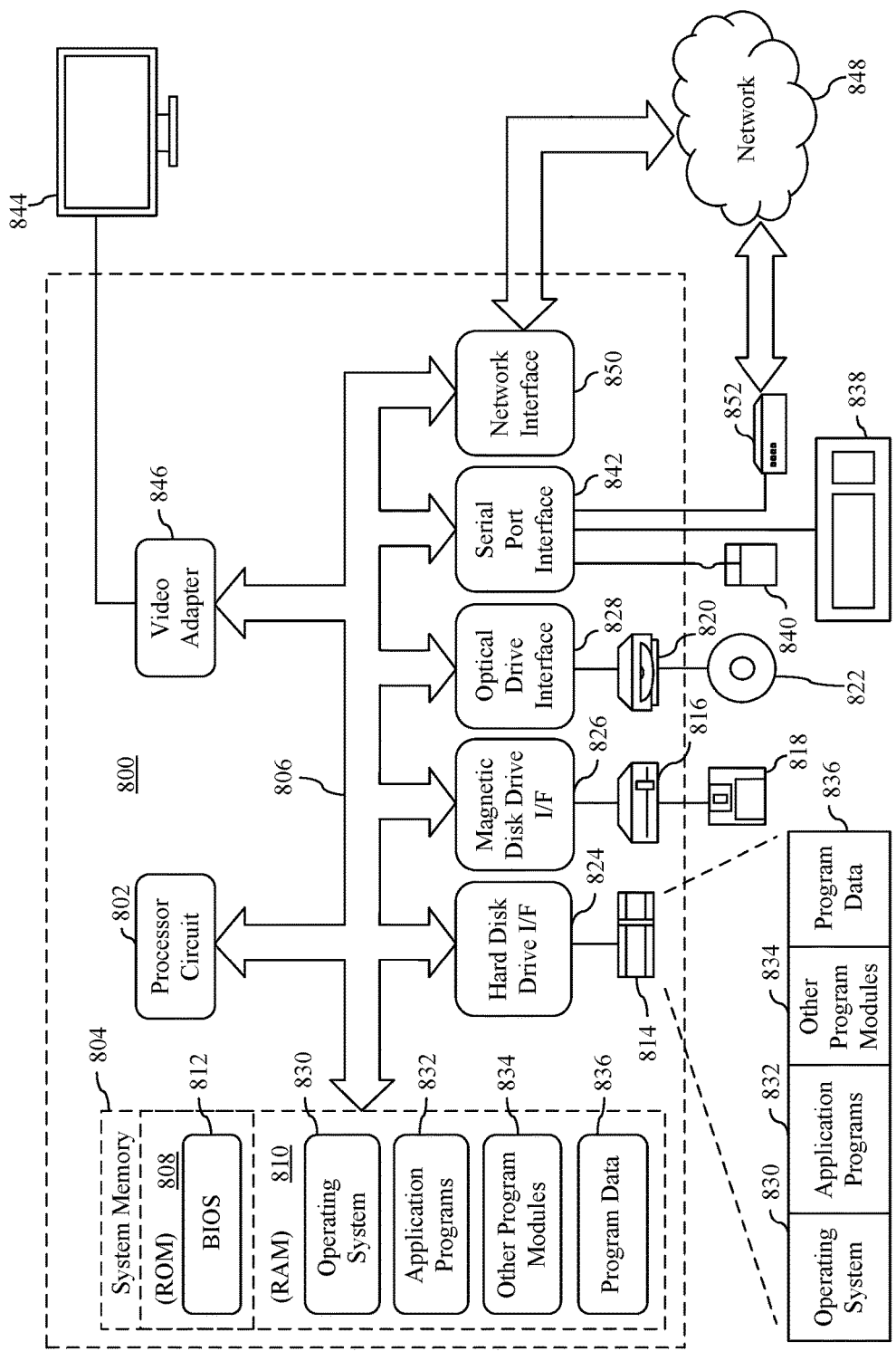
FIG. 8 is a block diagram of an example processor-based computer system that may be used to implement various example embodiments.

FIG. 8 depicts an implementation of a computing device 800 in which example embodiments may be implemented.

For example, computing device 102, remote device(s) 104, video game overlay 108, video game 116, video game model generator 320, display 702, and video game 704 may each be implemented in one or more computing devices similar to computing device 800 in stationary or mobile computer implementations, including one or more features of computing device 800 and/or alternative features. The description of computing device 800 provided herein is provided for purposes of illustration, and is not intended to be limiting. Example embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couple various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random-access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing one or more of the components of computing device 102, remote device(s) 104, video game overlay 108, video game 116, video game model generator 320, display 702, video game 704, and one or more steps of flowcharts 200, 400, 500, and 600 and/or further implementations described herein.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, stylus, pen, pointing device, etc.). In addition to display screen 844, computing device 800 may include other peripheral output devices (not shown) such as speakers and printers. Display screen 844, and/or any other peripheral output devices (not shown) may be used for implementing display 702, and/or any further implementations described herein.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Implementations are also directed to such communication media that are separate and non-overlapping with implementations directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of example embodiments discussed herein. Accordingly, such computer programs represent controllers of the computing device 800.

Implementations are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A system for annotating a video frame generated by a video game is described herein. The system includes: at least one processor circuit; at least one memory that stores program code configured to be executed by the at least one processor circuit, the program code comprising: a video game model generator that is configured to generate a video game model that associates element tags with elements of the video game; a video game overlay that is executed concurrently with the video game and includes: a receiver that is configured to receive a remote user input from one or more remote devices over a network; a parser that is configured to apply the video game model to parse the remote user input and extract therefrom an element tag corresponding to the video game; an element recognizer configured to apply the video game model to identify an element of the video game that corresponds to the element tag; and an annotation renderer configured to annotate the video frame based on the identified element and a location of the identified element.

In one implementation of the foregoing system, the video game model generator is configured to generate the video game model based on one or more of supervised training or unsupervised training.

In another implementation of the foregoing system, the receiver comprises a plurality of plugins via which the remote user input is received, wherein each plugin corresponds to a different remote service.

In another implementation of the foregoing system, the video game overlay further comprises a normalizer that is configured to normalize the remote user input prior to parsing thereof by the parser.

In another implementation of the foregoing system, the remote user input comprises a plurality of remote user input streams and the video game overlay further comprises: a multiplexer that combines the remote user input streams to generate a single multiplexed input stream prior to parsing thereof by the parser.

In another implementation of the foregoing system, the remote user input comprises at least one of: voice input; text input; touch screen input, or pointing device input.

In another implementation of the foregoing system, the remote user input comprises voice input and the video game overlay further comprises a speech-to-text converter that converts the voice input into text input prior to parsing thereof by the parser.

In another implementation of the foregoing system, the video game overlay further comprises: an annotation selector configured to select the annotation for rendering to the video frame based on one or more of the identified element and location.

In another implementation of the foregoing system, the annotation comprises at least one of: a highlight of the element; a visual indication of a direction to the element; a shape around the element; or an outline of the element.

A method for annotating a video frame generated by a video game is disclosed herein. The method includes: executing a video game overlay concurrently with the video game, the executing the video game overlay including: receiving a remote user input from one or more remote devices over a network; applying a video game model that associates element tags with elements of the video game to: parse the remote user input and extract therefrom an element tag corresponding to the video game; and identify an element of the video game that corresponds to the element tag; and annotating the video frame based on the identified element and a location of the identified element.

In one implementation of the foregoing method, the method further comprises generating the video game model based on one or more of supervised training or unsupervised training.

In another implementation of the foregoing method, the receiving the remote user input comprises receiving the remote user input via a plurality of plugins, wherein each plugin corresponds to a different remote service.

In another implementation of the foregoing method, the executing the video game overlay further comprises normalizing the remote user input prior to the parsing the remote user input.

In another implementation of the foregoing method, the remote user input comprises a plurality of remote user input streams and the executing the video game overlay further comprises: combining the remote user input streams to generate a single multiplexed input stream prior to the parsing the remote user input.

In another implementation of the foregoing method, the remote user input comprises at least one of: voice input; text input; touch screen input, or pointing device input.

In another implementation of the foregoing method, the remote user input comprises voice input and the executing the video game overlay further comprises converting the voice input into text input prior to the parsing the remote user input.

In another implementation of the foregoing method, the executing the video game overlay further comprises: selecting the annotation for rendering to the video frame based on one or more of the identified element and location.

In another implementation of the foregoing method, the annotating the video frame comprises at least one of: highlighting the element; displaying a visual indication of a direction to the element; displaying a shape around the element; or outlining the element.

A computer program product is disclosed herein. The computer program product includes: a computer-readable memory having computer program logic recorded thereon that when executed by at least one processor causes the at least one processor to perform a method comprising: executing a video game overlay concurrently with the video game, the executing the video game overlay comprising: receiving a remote user input from one or more remote devices over a network; applying a video game model that associates element tags with elements of the video game to: parse the remote user input and extract therefrom an element tag corresponding to the video game; and identifying an element of the video game that corresponds to the element tag; and annotating the video frame based on the identified element and a location of the identified element.

In one implementation of the foregoing computer program product, the remote user input comprises a plurality of remote user input streams and the executing the video game overlay further comprises: combining the remote user input streams to generate a single multiplexed input stream prior to the parsing the remote user input.

V. Conclusion

While various example embodiments have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the present invention should not be limited by any of the above-described example embodiments, but should be defined only in accordance with the following claims and their equivalents.

What is claimed is:

1. A system for annotating a video frame generated by a video game, the system comprising:
   at least one processor circuit;
   at least one memory that stores program code configured to be executed by the at least one processor circuit, the program code comprising:
      a video game model generator that is configured to generate a video game model that associates element tags with elements of the video game;
      a video game overlay that is executed concurrently with the video game and includes:
         a receiver that is configured to receive a remote user input from one or more remote devices over a network;
         a parser that is configured to apply the video game model to parse the remote user input and extract therefrom an element tag corresponding to the video game;
         an element recognizer configured to apply the video game model to identify an element of the video game that corresponds to the element tag; and
         an annotation renderer configured to annotate the video frame based on the identified element and a location of the identified element.

2. The system of claim 1, wherein the video game model generator is configured to generate the video game model based on one or more of supervised training or unsupervised training.

3. The system of claim 1, wherein the receiver comprises a plurality of plugins via which the remote user input is received, wherein each plugin corresponds to a different remote service.

4. The system of claim 1, wherein the video game overlay further comprises a normalizer that is configured to normalize the remote user input prior to parsing thereof by the parser.

5. The system of claim 1, wherein the remote user input comprises a plurality of remote user input streams and wherein the video game overlay further comprises:
   a multiplexer that combines the remote user input streams to generate a single multiplexed input stream prior to parsing thereof by the parser.

6. The system of claim 1, wherein the remote user input comprises at least one of:
   voice input;
   text input;
   touch screen input; or
   pointing device input.

7. The system of claim 6, wherein the remote user input comprises voice input and wherein the video game overlay further comprises a speech-to-text converter that converts the voice input into text input prior to parsing thereof by the parser.

8. The system of claim 1, wherein the video game overlay further comprises:
   an annotation selector configured to select the annotation for rendering to the video frame based on one or more of the identified element and location.

9. The system of claim 1, wherein the annotation comprises at least one of:
   a highlight of the element;
   a visual indication of a direction to the element;
   a shape around the element; or
   an outline of the element.

10. A method for annotating a video frame generated by a video game, the method comprising:
    executing a video game overlay concurrently with the video game, the executing the video game overlay including:
       receiving a remote user input from one or more remote devices over a network;
       applying a video game model that associates element tags with elements of the video game to:
          parse the remote user input and extract therefrom an element tag corresponding to the video game; and
          identify an element of the video game that corresponds to the element tag; and
       annotating the video frame based on the identified element and a location of the identified element.

11. The method of claim 10, further comprising:
    generating the video game model based on one or more of supervised training or unsupervised training.

12. The method of claim 10, wherein the receiving the remote user input comprises receiving the remote user input via a plurality of plugins, wherein each plugin corresponds to a different remote service.

13. The method of claim 10, wherein the executing the video game overlay further comprises normalizing the remote user input prior to the parsing the remote user input.

14. The method of claim 10, wherein the remote user input comprises a plurality of remote user input streams and wherein the executing the video game overlay further comprises:
    combining the remote user input streams to generate a single multiplexed input stream prior to the parsing the remote user input.

15. The method of claim 10, wherein the remote user input comprises at least one of:
    voice input;
    text input;
    touch screen input; or
    pointing device input.

16. The method of claim 15, wherein the remote user input comprises voice input and wherein the executing the video game overlay further comprises converting the voice input into text input prior to the parsing the remote user input.

17. The method of claim 10, wherein the executing the video game overlay further comprises:
    selecting the annotation for rendering to the video frame based on one or more of the identified element and location.

18. The method of claim 10, wherein the annotating the video frame comprises at least one of:
    highlighting the element;
    displaying a visual indication of a direction to the element;
    displaying a shape around the element; or
    outlining the element.

19. A computer program product comprising a computer-readable memory having computer program logic recorded thereon that when executed by at least one processor causes the at least one processor to perform a method comprising:

executing a video game overlay concurrently with the video game, the executing the video game overlay comprising:
  receiving a remote user input from one or more remote devices over a network;
  applying a video game model that associates element tags with elements of the video game to:
    parse the remote user input and extract therefrom an element tag corresponding to the video game; and
    identifying an element of the video game that corresponds to the element tag; and
  annotating the video frame based on the identified element and a location of the identified element.

20. The computer program product of claim 19, wherein the remote user input comprises a plurality of remote user input streams and wherein the executing the video game overlay further comprises:
  combining the remote user input streams to generate a single multiplexed input stream prior to the parsing the remote user input.

\* \* \* \* \*